United States Patent [19]
Bosio

[11] Patent Number: 5,402,819
[45] Date of Patent: Apr. 4, 1995

[54] DEVICE FOR INSTALLING SINGLE-CONTROL MIXER CARTRIDGES IN BATHTUB FAUCETS

[75] Inventor: Orlando Bosio, Casaloldo, Italy

[73] Assignee: AMFAG S.r.l., Castelgoffredo, Italy

[21] Appl. No.: 67,893

[22] Filed: May 27, 1993

[30] Foreign Application Priority Data

Jun. 1, 1992 [IT] Italy ............................. MN92A016

[51] Int. Cl.⁶ ........................................... F16K 11/074
[52] U.S. Cl. ................................ 137/270; 137/625.17; 137/625.4
[58] Field of Search ................ 137/270, 625.17, 625.4, 137/625.41

[56] References Cited

U.S. PATENT DOCUMENTS

| | | | |
|---|---|---|---|
| 4,584,723 | 4/1986 | Hussauf | 137/625.4 X |
| 4,676,270 | 6/1987 | Knapp et al. | 137/625.17 X |
| 4,942,902 | 7/1990 | Knapp | 137/625.17 |
| 4,971,112 | 11/1990 | Knapp | 137/625.17 X |

FOREIGN PATENT DOCUMENTS 9112021 12/1991 Germany.
8603568 6/1986 WIPO.

Primary Examiner—John Rivell
Attorney, Agent, or Firm—Guido Modiano; Albert Josif; Daniel O'Byrne

[57] ABSTRACT

Device including a disk provided with two through holes suitable to be arranged at two ducts which extend from the bottom openings of the cartridge for the inflow of hot and cold water, and including a flat face suitable to connect to the end of the ducts, as well as a dividing element extending from the other face and dividing the portion of the well comprised between the base and the disk into two separate chambers for the inflow of hot and cold water respectively.

7 Claims, 2 Drawing Sheets

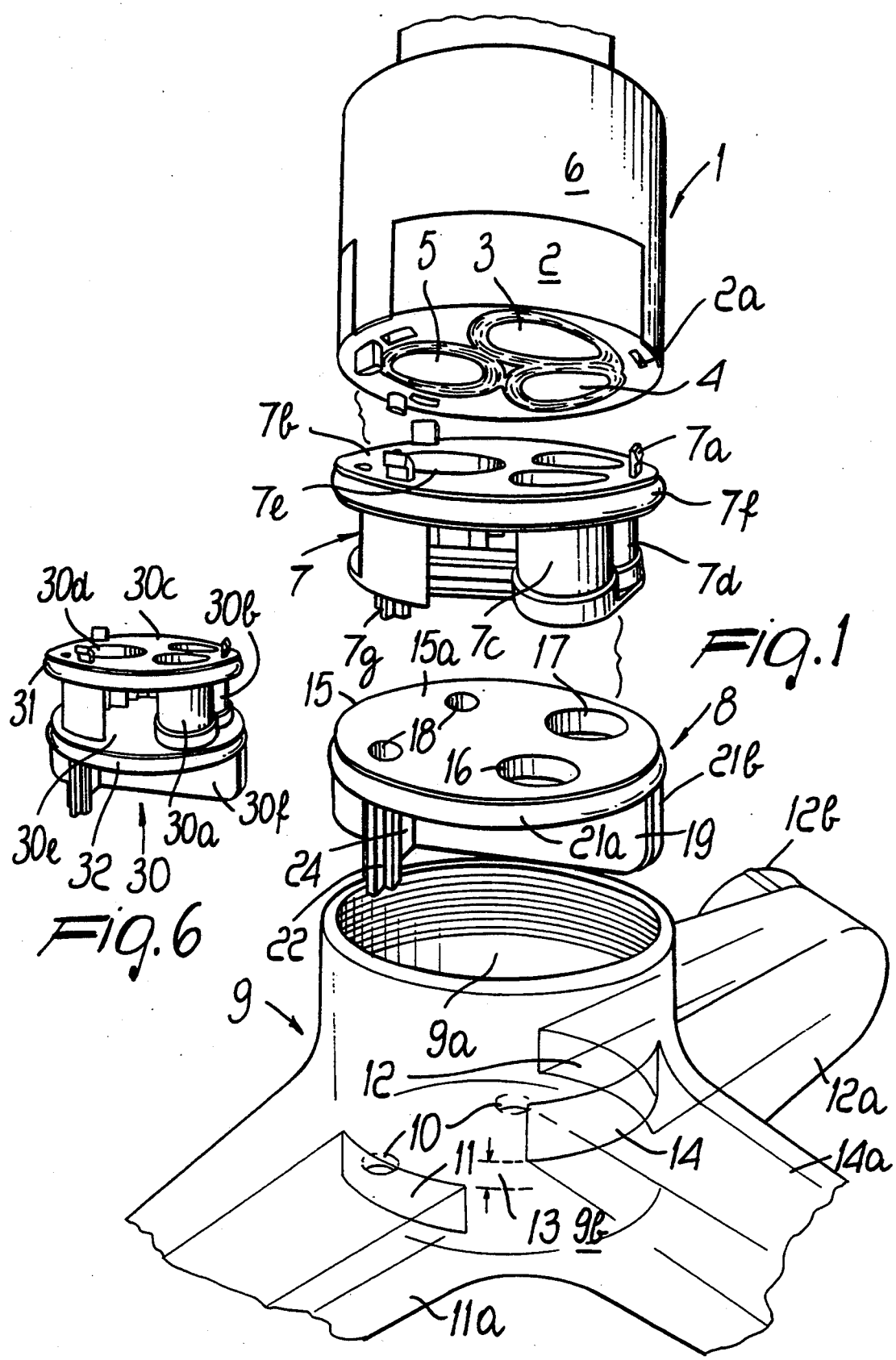

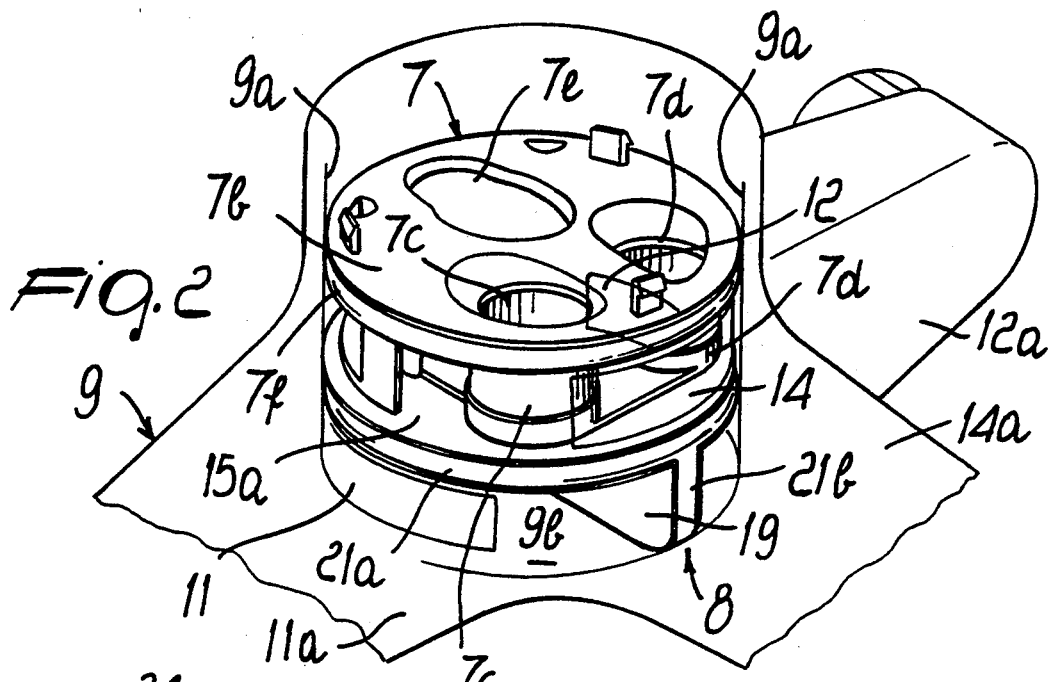

5,402,819

DEVICE FOR INSTALLING SINGLE-CONTROL MIXER CARTRIDGES IN BATHTUB FAUCETS

BACKGROUND OF THE INVENTION

The present invention relates to a device for installing single-control mixer cartridges in bathtub faucets.

Devices known as single-control mixer cartridges have become very popular; these devices are inserted in faucets of all kinds and in bathtub faucets or units. By operating a single actuation lever, the delivery flow-rate can be varied from zero to a maximum value and also the temperature of the water can be varied by mixing the hot and cold water reaching the faucet or bathtub unit.

Mixer cartridges are known which can be inserted in an optimum manner in faucets of the type used for washbasins or bidets; one such cartridge is obtained by converting a cartridge of the type described in U.S. patent application Ser. No. 08/053,274 in the name of the same Applicant and incorporated herein by reference, said cartridge being engaged with a supplemental bottom of the type described and claimed in U.S. patent application Ser. No. 08/056,632, also in the name of the same Applicant, and incorporated herein by reference.

Such cartridges are also insertable in bathtub units, however said units have to be manufactured with complicated shapes in order to accommodate said cartridges. This is disadvantageous since it adversely affects the cost of the bathtub unit and negatively affects its functionality, creating water passages which are incorrect from the point of view of fluid dynamics.

SUMMARY OF THE INVENTION

An aim of the present invention is thus to provide a device for installing a single-control mixer cartridge for hot and cold water which is particularly suitable for a bathtub unit.

Within this aim, an object of the invention is to provide a device which allows, by adding it to a cartridge of a type suitable to fit in an optimum manner in faucets of the type used for washbasins or bidets, a great simplification of the bathtub unit in which said cartridge is inserted or installed.

This aim is achieved by a device for installing a single-control mixer cartridge for hot and cold water particularly suitable for a bathtub unit, according to the present invention, said cartridge comprising two ducts extending from the openings formed in the bottom for the separate inflow of hot and cold water and an opening in the bottom for the outflow of hot, cold or mixed water, and furthermore comprising a peripheral circumferential gasket substantially at said bottom or arranged above it; said bathtub unit comprising a cavity for accommodating said cartridge which: is shaped like a well, with a cylindrical side wall and a flat base; has, at a first band of the side wall which is proximate to the base, outflow openings of inflow ducts for hot and cold water respectively; and is furthermore provided with at least one outflow opening for hot, cold or mixed water at a second band of the side wall which lies above said first band and is separated from it by means of a third continuous band; characterized in that it comprises a disk provided with two through holes suitable to locate themselves at the two ducts extending from the openings provided in the bottom of the cartridge for the separate inflow of hot and cold water and comprises a substantially flat face suitable to connect to the end of said ducts, as well as a dividing element extending from the other face and suitable to divide the portion of space comprised within the well, between the base and said disk, into two separate chambers, wherein each one of the inflow openings for hot and cold water respectively and one of the holes present in the disk opens; a gasket being also provided which comprises a circumferential portion suitable to make contact with the third band of the side wall of the well and from which portions extend monolithically, are inserted in seats formed within the dividing element and are suitable to make contact with the base and the side walls of the well to delimit said two separate chambers; there being also registration pins suitable to enter seats in the base of the well.

BRIEF DESCRIPTION OF THE DRAWINGS

Further characteristics and advantages of the present invention will become apparent from the following description of two preferred but not exclusive embodiments thereof, illustrated only by way of non-limitative example in the accompanying drawings, wherein:

FIG. 1 is an exploded view of the device according to the present invention in a first embodiment, with the related cartridge and the bathtub unit;

FIG. 2 is a view of the device inserted within the bathtub unit;

FIG. 3 is a perspective view of the device according to the present invention;

FIG. 4 is a view of the gasket of the device;

FIG. 5 is a view of a bathtub unit different from the one shown in FIG. 1;

FIG. 6 is a view of a further embodiment of the present invention.

DESCRIPTION OF THE PREFERRED EMBODIMENTS

With reference to the above FIGS. 1 to 5, the reference numeral 1 generally designates a mixer cartridge of the type described and claimed in U.S. patent application Ser. No. 08/053,274 filed in the name of the same Applicant.

Said cartridge comprises the bottom 2 provided with the openings 3 and 4 for the separate inflow of hot and cold water and with the outflow opening 5 for hot, cold or mixed water; the body 6 is associated with said bottom in order to contain well-known elements which allow, by operating a single lever, to vary the dispensed water flow-rate from zero to a maximum value and to vary the temperature of said water.

The cartridge 1 is ideally suited for being inserted in flush-mounted faucets for bathtubs and showers; in order to make it also suitable for being inserted in faucets such as those suitable for washbasins or bidets, the same Applicant has disclosed, in U.S. patent application Ser. No. 08/056,632 incorporated herein by reference, the supplemental bottom designated by the reference numeral 7, which is stably engaged on the cartridge 1 by snap-together locking of the legs, such as 7a, in the slots, such as 2a, and produces a conversion of said cartridge thus making it suitable for use in washbasin or bidet faucets.

Said supplemental bottom 7 comprises a disk 7b, from which two ducts 7c and 7d extend; said ducts are open at their ends and are arranged at the openings 3 and 4 provided in the bottom for the inflow of hot and cold water into the cartridge; the hole 7e is also present in said disk 7b at the opening 5 provided in the bottom for the outflow of hot, cold or mixed water; at the peripheral region of the disk 7b there is also the circumferential gasket 7f, which makes contact with the walls of the cartridge accommodation well.

When the supplemental bottom 7 is stably engaged with the cartridge 1, a cartridge ideally suitable for being inserted in faucets for washbasins or bidets is thus provided; it comprises the two ducts 7c and 7d, extending from the openings 3 and 4 to directly connect said openings to holes for the inflow of hot and cold water respectively provided in the base of the cartridge accommodation well in said faucets for washbasins or bidets, and furthermore comprises an opening formed by the continuity of the opening 5 with respect to the hole 7e; hot, cold or mixed water flows out of this opening and, by passing outside the ducts 7c and 7d, reaches the opening for flowing out of the well, which is formed in the side wall portion of said well which is between the base of the well and the gasket 7f.

Both the cartridge designated by the reference numeral 1, which is particularly suitable for flush-mounted faucets for bathtubs and showers, and the cartridge converted with the coupling of the supplemental bottom 7, which is particularly suitable for faucets for washbasins and bidets, are also insertable in bathtub units; however, in order to adapt to said cartridges for installation in bathtub units, these units assume complicated shapes which are disadvantageous from the point of view of cost and functionality.

The device according to the present invention, generally designated by the reference numeral 8, has been designed to allow the insertion of the cartridge converted with the addition of the supplemental bottom 7 in a bathtub unit such as the one designated by the reference numeral 9, which has an extremely simplified shape with respect to known bathtub units, and is described and claimed in a copending U.S. patent application filed in the name of the same Applicant, and incorporated herein by reference.

Said bathtub unit 9 comprises the well for accommodating the mixer cartridge; said well is shaped so that it forms the cylindrical wall 9a with a flat base 9b provided with seats 10 for registration pins.

The outflow openings 11 and 12 of the inflow ducts 11a and 12a for hot and cold water respectively are present at a first band of the side wall 9a proximate to the base 9b; the outflow opening 14 for hot, cold or mixed water which gives access to the duct 14a is present at a second band of the side wall which lies above said first band and is separated from it by means of the continuous band 13; said outflow opening 14 is termed "front opening", since it is opposite to the connectors such as 12b.

The device 8 according to the present invention comprises a disk 15 provided with through holes 16 and 17 which are arrangeable at ducts 7c and 7d which, importantly, are provided with sealing gaskets at their ends.

The substantially flat face 15a of the disk 15 makes contact with the end of the ducts 7c and 7d, as clearly shown in FIG. 2, and comprises the seats 18 for the registration pins, such as 7g, extending from the supplemental bottom 7.

A dividing element 19 extends from the face 15b of the disk 15, is shaped like a diametrical flat wall and has, on its edge, seats connected to the seat 20a provided at the edge of the disk 15 for containing the gasket, which is generally designated by the reference numeral 21.

More specifically, said gasket 21 comprises a circumferential portion 21a which is inserted in the seat 20a and makes contact, as clearly shown in FIG. 2, with the third band 13 of the side wall 9a of the well. Portions 21b and 21c extend from said portion 21a; the portions 21b are inserted in the seats 20b and make contact with the side wall 9a of the well, and said portion 21c is inserted in the seat 20c and makes contact with the base 9b of the well.

All of the walls of the gasket 21 which make contact with the bottom of the described seats are part of a single ideal frustum-shaped surface corresponding to the smooth frustum-shaped surface of a punch which acts in combination with a gasket-forming mold in which an impression complementary to the other walls, which are shaped so as to allow extraction, is formed; this allows to obtain the gasket in a particularly advantageous manner.

The device 8 is completed by registration pins 22 and 23 which engage the seats 10 present in the base 9b of the well, and by resting elements 24 and 25 extending from the wall 19 to connect the pins 22 and 23.

The presence of the element 19 divides the portion of space comprised among the first band of the side wall 9a of the well, the base 9b of said well and the disk 15 into two chambers perfectly isolated by the gasket 21; the outflow opening 11 of the hot water inflow duct opens into the first chamber and is connected to the duct 7c by means of the hole 16; the outflow opening 12 of the cold water inflow duct opens into the second chamber and is connected to the duct 7d by means of the hole 17.

The operation of the device according to the present invention is evident: hot water enters the first chamber through the opening 11 and has to flow therefrom into the duct 7c to reach the inflow opening 3 of the cartridge, whereas cold water enters the second chamber through the opening 12, flows into the duct 7d and reaches the inflow opening 4 of the cartridge.

The hot, cold or mixed water flowing out of the cartridge through the opening 5 and the corresponding hole 7e enters the portion of space comprised among the second band of the side wall of the well delimited by the gaskets 7f and 21a, the lower face of the disk 7b of the supplemental bottom 7, and the face 15a of the disk 15 of the device according to the invention, and from this portion of space the water can only enter the outflow opening 14, externally affecting the ducts 7c and 7d.

The device according to the invention continues to perform its function in an optimum manner even if it is inserted in a bathtub unit wherein the outflow opening is located in any position within the second band of the side wall of the well: this is the case, for example, of the bathtub unit designated by the reference numeral 26 in FIG. 5, in which, without varying the position of the inflow openings 27 and 28 for hot and cold water with respect to the unit designated by the reference numeral 9, the outflow opening 29 for hot, cold or mixed water is located at the rear portion of said second band of the side wall.

In FIG. 6, the reference numeral 30 designates a further embodiment of the invention, which is obtained by monolithically connecting the ducts to the disk of the device so that they communicate with the openings 3 and 4; in this embodiment, therefore, ducts 30a, 30b which end at said openings 3 and 4 monolithically connect the disk 30c, which is provided with the gasket 31 and with the hole 30d arranged at the opening 5, to the disk 30e. The disk 30e is provided with holes at the ducts 30a, 30b and a wall 30f extends therefrom; said wall 30f forms an element provided with a gasket 32 identical to the one designated by the reference numeral 21 in FIG. 4.

From the above description it can thus be understood that the invention provides a device which allows, in an optimum manner, the insertion of a mixer cartridge such as the one described in a bathtub unit of maximum simplicity.

Before concluding, it should be clarified that mention has always been made so far of a bathtub unit merely for the sake of simplicity, considering it as representative of an entire range of products constituted by external wall-mounted or rim-mounted faucet units usable not only for bathtubs but also in different devices, such as washbasins or showers.

The described device according to the present invention is susceptible to numerous modifications and variations, all of which are within the scope of the inventive concept; thus, for example, the dividing element may have any shape, suitable to delimit the two separate chambers for the inflow of hot and cold water respectively.

I claim:

1. Supplemental device for a single-control mixer cartridge for hot and cold water particularly suitable for a bathtub unit, said cartridge comprising two ducts extending from openings formed in a bottom for the separate inflow of hot and cold water and an outflow opening in the bottom for hot, cold or mixed water, and furthermore comprising a peripheral circumferential gasket substantially at said bottom or arranged above it; said bathtub unit comprising a cavity for accommodating said cartridge which: is shaped like a well, with a cylindrical side wall and a flat base; has, at a first band of the side wall which is proximate to the base, outflow openings of inflow ducts for hot and cold water respectively; and is furthermore provided with at least one outflow opening for hot, cold or mixed water at a second band of the side wall which lies above said first band and is separated therefrom by a third continuous band; further comprising a disk provided with two through holes locatable at two ducts extending from the openings provided in the bottom of the cartridge for the separate inflow of hot and cold water and comprises a substantially flat face suitable to connect to the end of said ducts, as well as a dividing element extending from another face thereof and suitable to divide the portion of space comprised within the well, between the base and said disk, into two separate chambers, wherein each one of the inflow openings for hot and cold water respectively and one of the holes present in the disk opens; there being also a gasket comprising a circumferential portion for contact with the third band of the side wall of the well, said gasket having portions which extend monolithically therefrom, said portions being inserted in seats formed within the dividing element and are suitable to make contact with the base and the side walls of the well to delimit said two separate chambers; there being also registration pins suitable to enter seats provided in the base of the well.

2. Device according to claim 1, wherein the substantially flat face of the disk is connected by resting to the end of the ducts extending from the openings provided in the bottom of the cartridge for the separate inflow of hot and cold water, and is provided with seats for the registration pins extending from the cartridge.

3. Device according to claim 1, wherein the substantially flat face of the disk is connected monolithically to the end of the ducts extending from the openings provided in the bottom of the cartridge for the separate inflow of hot and cold water.

4. Device according to claim 1, wherein the dividing element is formed in the shape of a flat diametrical wall provided, at its edge, with seats communicating with a seat, provided at the edge of the disk, for containing said portions extending monolithically from said gasket.

5. Device according to claim 1, further comprising elements for resting on the base of the well.

6. Device according to claim 5, wherein the elements for resting on the base of the well connect the wall forming the dividing element to the registration pins.

7. Device according to claim 1, wherein all the walls of the gasket which make contact with the bottom of the seats formed in the dividing element and in the circumferential edge of the disk belong to a single ideal frustum-shaped surface corresponding to the continuous frustum-shaped surface of a punch which acts in combination with a gasket forming mold, the remaining walls extending from said walls being shaped so as to allow removal of the gasket from said mold.

* * * * *